United States Patent
Laurent et al.

(10) Patent No.: US 6,547,260 B2
(45) Date of Patent: *Apr. 15, 2003

(54) VEHICLE SUSPENSION HAVING ACTIVE CAMBER VARIATION

(75) Inventors: Daniel Laurent, Marly (CH); Marc Sebe, Marly (CH)

(73) Assignee: Conception et Developpement Michelin S.A. (CH)

(*) Notice: Subject to any disclaimer, the term of this patent is extended or adjusted under 35 U.S.C. 154(b) by 0 days.

This patent is subject to a terminal disclaimer.

(21) Appl. No.: 10/097,070

(22) Filed: Mar. 13, 2002

(65) Prior Publication Data

US 2002/0093152 A1 Jul. 18, 2002

Related U.S. Application Data

(60) Continuation of application No. 09/710,296, filed on Nov. 11, 2000, now Pat. No. 6,406,036, which is a division of application No. 09/078,052, filed on May 13, 1998, now Pat. No. 6,170,838.

(30) Foreign Application Priority Data

May 16, 1997 (FR) ............................................. 97 06227

(51) Int. Cl.[7] ........................ B60G 17/01; B60G 21/05; B62D 17/00
(52) U.S. Cl. ................................ 280/5.509; 280/5.521; 280/124.103; 280/124.127
(58) Field of Search ........................... 280/5.521, 5.52, 280/5.508, 5.509, 124.103, 124.112, 124.127, 124.126, 86.757

(56) References Cited

U.S. PATENT DOCUMENTS

| | | | | |
|---|---|---|---|---|
| 2,152,938 A | * | 4/1939 | Welch ................. | 280/124.103 |
| 2,279,120 A | * | 4/1942 | Hurley .................... | 280/5.509 |
| 3,485,506 A | * | 12/1969 | Melbar et al. ........... | 280/5.521 |
| 3,497,233 A | * | 2/1970 | Bolaski, Jr. ............ | 280/86.757 |
| 3,567,243 A | * | 3/1971 | Ruhlin ................ | 280/124.127 |
| 4,487,429 A | * | 12/1984 | Ruggles .................... | 280/5.521 |
| 4,546,997 A | * | 10/1985 | Smyers ..................... | 280/5.521 |
| 4,700,972 A | * | 10/1987 | Young ..................... | 280/5.521 |

* cited by examiner

*Primary Examiner*—Peter C. English
(74) *Attorney, Agent, or Firm*—Baker Botts L.L.P.

(57) ABSTRACT

The vehicle includes a suspended running chassis (1) making it possible to define a longitudinal and vertical plane forming a reference on the chassis (1), the preferred running direction being parallel to the longitudinal plane, and at least two wheel connecting systems, the wheels (2) of which are not aligned relative to the longitudinal plane, the wheel connecting systems being mounted on the chassis (1) on either side of the latter in the transverse direction, each of the wheel connecting systems including a wheel (2) mounted on a support (5) by means of a suspension device allowing vertical deflection of the wheel (2) relative to the support (5), the suspensions being independent of one another. Each support (5) is mounted on the chassis (1) by means of a camber mechanism which includes a camber lever (4) and an actuating lever (40) making it possible to vary the camber angle of the corresponding wheel (2). The camber mechanism includes an arm (70) mounted on the support (5) on an axis of support oriented substantially parallel to the longitudinal plane, and mounted on the chassis (1) without any possibility of tilting about a longitudinal axis relative to the chassis (1), so as to transmit the weight carried by the chassis to the support (5).

12 Claims, 5 Drawing Sheets

VEHICLE SUSPENSION HAVING ACTIVE CAMBER VARIATION

This is a continuation of U.S. Ser. No. 09/710,296, filed Nov. 11, 2000, now U.S. Pat. No. 6,406,036, which is a divisional of U.S. application Ser. No. 09/078,052, filed on May 13, 1998, now U.S. Pat. No. 6,170,838, which claims priority to French patent application 97/06227, filed May 16, 1997.

BACKGROUND OF THE INVENTION

The present invention relates to a suspension for vehicles, in particular road vehicles. It relates both to the guidance of a vehicle wheel relative to the body of this vehicle and to the organization of the deflection of the wheel relative to the chassis. It relates more particularly to means used for actively controlling the position of the wheel plane relative to the body.

It is known that a wheel is mounted on a hub and that the hub is mounted on a wheel carrier by means of a rolling bearing which embodies the axis of rotation of the wheel. The guidance of the wheel involves allowing the wheel carrier to be displaced relative to the vehicle by an extent which is sufficient for the suspension of the vehicle. Moreover, the guidance of the wheel must be such that the control of the path of the vehicle via the grip of the tires on the ground is ensured under the best possible conditions. The deflecting movement which is sought is of great extent in the vertical direction.

It is customary for this movement to be designated by the expression "vertical suspension". It may be desirable to allow slight movement in the longitudinal direction ("horizontal suspension" is then referred to), while, ideally, the aim is to avoid any relative movement in the transverse direction. Moreover, the steering and the camber variations which all these movements may induce must be strictly contained, thus also resulting in a design constraint which the average person skilled in the art must take into account.

If the "plane" of the wheel is what is meant by the plane perpendicular to the axis of rotation of the wheel and passing through the middle of the wheel or, more specifically, through the center of the area of contact with the ground of a tire mounted on said wheel, the control of the deflecting movements is tantamount to saying that guidance must ensure a strictly controlled position of the plane of the wheel relative to the chassis. It is still possible to define a longitudinal and vertical plane forming a reference to identify the preferred running direction which is parallel to said longitudinal plane. The purpose of guiding the plane of the wheel is to control as strictly as possible the relative position of the plane of the wheel relative to said longitudinal plane in terms of angle and distance.

The guidance of the wheel plane directly affects the attitude of the tire in relation to the ground, hence the stresses which said tire undergoes and the more or less favorable position which it assumes in order to transmit forces, in particular forces in the transverse direction. Now these forces are known to be of primary importance for the guidance of the vehicle and therefore for safety.

Road vehicles in use at the present time are known to experience a rolling movement precisely because of their suspension. In fact, the centrifugal force causes a transfer of load toward the outside of the bend, thus resulting in an increase in compression of the suspensions on the outside of the bend and an expansion of the suspensions on the inside of the bend. Now this roll is detrimental both to passenger comfort and to the roadholding of the vehicle due to the increase in the camber of the wheels which it brings about. The means used most often to combat this roll involves using one or more antiroll bars. Unfortunately, an antiroll bar can only limit the roll by opposing a reaction torque to the latter. In principle, it cannot prevent roll from taking hold, and therefore it cannot prevent the wheels from being inclined in a direction unfavorable to the proper functioning of the tires.

Other solutions making it possible to combat roll more radically are also known. It is possible to conceive a pendulum suspension (purely passive). Such suspensions can force the wheel plane to be inclined toward the inside of the bend by means of a suitable mechanism, or else they can also transfer the rolling axis of the vehicle above the center of gravity, so that the vehicle body is naturally inclined toward the inside of the bend. However, pendulum suspensions have not had much success, probably because of the difficulty of installing suspension arms and joints making it possible to achieve this result. The intrusion of suspension arms and joints in places which it is desirable to leave free for the passenger compartment or for installing the engine or transmission of the vehicle would appear to be a disadvantage. This problem seems to limit this type of suspension to a few types of vehicle, such as, for example, in the field of railroads. Moreover, in general terms pendulum suspensions increase the overload on the wheels located on the outside of the bend by displacing the center of gravity of the vehicle toward the outside of the bend. This is particularly detrimental with regard to road vehicles equipped with tires.

Moreover, research for an even better compromise between suspension comfort and roadholding leads to the provision of so-called active or semiactive suspensions, the control of which is now made possible by advances in electronics. However, it is found that these control means are transplanted onto suspensions which are still of traditional mechanical design, said control means being adapted to the defects of these suspensions, without looking to make use of new parameters in suspension kinematics. In other words, active or semiactive suspensions are concerned simply with controlling the damping characteristics of the suspensions and even the flexibility characteristics, while at the same time preserving suspension kinematics derived directly from conventional forms of construction.

SUMMARY OF THE INVENTION

The object of the invention is to improve the operating safety of vehicles by means of suspension kinematics allowing active control of the camber of the wheel, in order to maintain the tires in a position relative to the ground which is as favorable as possible to their grip and their fatigue strength, even in the event of extremely severe stresses.

The invention provides a vehicle comprising:
- a suspended running chassis making it possible to define thereon a longitudinal and vertical plane forming a reference, the preferred running direction of the vehicle being parallel to said longitudinal plane,
- at least two wheel connecting systems, each comprising a wheel, said wheel connecting systems being mounted on said chassis on either side of the latter in a transverse direction, each of the wheel connecting systems comprising a wheel mounted on a support by means of a suspension device allowing deflection of the wheel relative to the support, said suspensions being independent of one another, the deflecting movement taking place in the plane of the wheel, the deflection stroke being sufficient to afford the required vertical suspension movement,
wherein each support is mounted on said chassis by means of a camber mechanism making it possible to vary the camber angle of the corresponding wheel, said camber mechanism acting between the chassis and each support, so as to incline the plane of each wheel relative to said longitudinal plane in order to impart a camber angle of desired amplitude to the planes of said wheels, thus inclining all the wheels relative to the ground in the same direction.

It is especially advantageous to control the camber angle so as to improve the behavior or comfort of the vehicle on a bend. The invention makes it possible to incline the plane of each wheel in the opposite direction to transverse acceleration. For this purpose, the vehicle comprises at least one sensor for recording the value of at least one parameter making it possible to evaluate the transverse acceleration exerted on the vehicle, and calculation means for calculating the amplitude of each camber angle as a function of the value or values recorded, said camber mechanism comprising control means acting under the control of said calculation means.

Typically, the transverse acceleration in question is the centrifugal force occurring on a bend. The invention allows active control of the camber of the wheels. By virtue of the arrangement provided by the invention, a tendency of tires to exhibit pronounced wear at the shoulders is combated effectively, this tendency being well known in passenger cars driven for sport. In this case, the tread may be excessively offset axially toward the center of the vehicle. The active control of the camber corrects this tendency. Moreover, even when, simultaneously, the wheel experiences camber variations and the vertical suspension experiences pronounced deflections, the mode of functioning of the tire remains as far as possible optimal.

It may be noted that the camber is the angle which the plane of the wheel forms relative to a straight line perpendicular to the ground. Of course, it is not possible to act directly thereon by controlling the position of the wheel relative to the ground, since it is inconceivable to come to bear on the ground itself in order to control the camber variation. It is possible only to act indirectly via a mechanism connected to the chassis.

The invention applies particularly to four-wheeled vehicles, such as passenger cars. The camber angle variation concerned here is of great extent, that is to say is nearer the values frequently swept by motorcycles than the set values which may exist in a conventional four-wheeled passenger car. For clarification, the range of variation is of the order of ±15° to ±20. At all events, the range of variation is such that, when the wheel tilts about its area of contact with the ground, the transverse displacement of the radially upper part of the wheel may reach an extent greater than the width of said wheel. Of course, the amplitude of the camber is possibly not identical for each of the wheels of the vehicle, whereas the tilting direction of the wheels is always the same and is directed opposite to the transverse acceleration originating from the centrifugal force. The top of the wheel therefore tilts in the centripetal direction.

It can be seen that the invention provides suspension kinematics which are as pure as possible: the wheel connecting system not only offers vertical suspension, but it also makes it possible to modify the camber of the wheel at any moment, without thereby reducing the stroke of the vertical suspension in terms of either compression or expansion, while at the same time maintaining vertical suspension under optimal operating conditions. Strictly speaking, it would be more appropriate to refer to deflection located in the wheelplane and directed perpendicularly to the running movement of the vehicle. For the sake of linguistic convenience, this degree of freedom is designated by "vertical suspension".

In an especially advantageous variant, the invention provides an assembly making it possible to integrate the guidance and the elements necessary for the so-called vertical suspension into the interior of the wheel. The essential functions of the suspension (guidance of the wheel plane, degree of freedom of deflection in the desired direction and control of the deflecting movements) are thereby integrated into the volume within the wheel. This makes it possible to ensure that the assembly is highly compact.

According to another variant, the invention provides a passenger car with active control of roll: the passenger compartment of the vehicle is mounted on the chassis in such a way that said compartment can be inclined toward the inside of the bend as a function of the centrifugal force. Here again, although roll is a measure of the lean angle of the passenger compartment relative to the ground, action is taken on the roll angle indirectly by bearing on the chassis. The object is to achieve a substantial range of variation of the roll angle of the passenger compartment, of the same order of magnitude as the range of variation of the camber. Thus, without necessarily achieving the roll angles which a vehicle having two in-line wheels (for example a motorcycle) may assume, the effect produced is sufficiently noticeable to alter radically the impression felt by the passengers of such a vehicle and thus to contribute to their comfort.

Another embodiment provides a horizontal suspension of the wheels, that is to say a suspension which allows the wheels to move along the longitudinal axis relative to the chassis when they encounter an obstacle. This contributes to comfort by avoiding transmitting violent shocks to the tire, due to the reduction in the impact speed.

The invention will be understood better from the following description relating to a four wheeled vehicle. The invention applies particularly to vehicles comprising at least four wheels, although the example given is not limiting.

DESCRIPTION OF PREFERRED EMBODIMENTS

Figure 1:
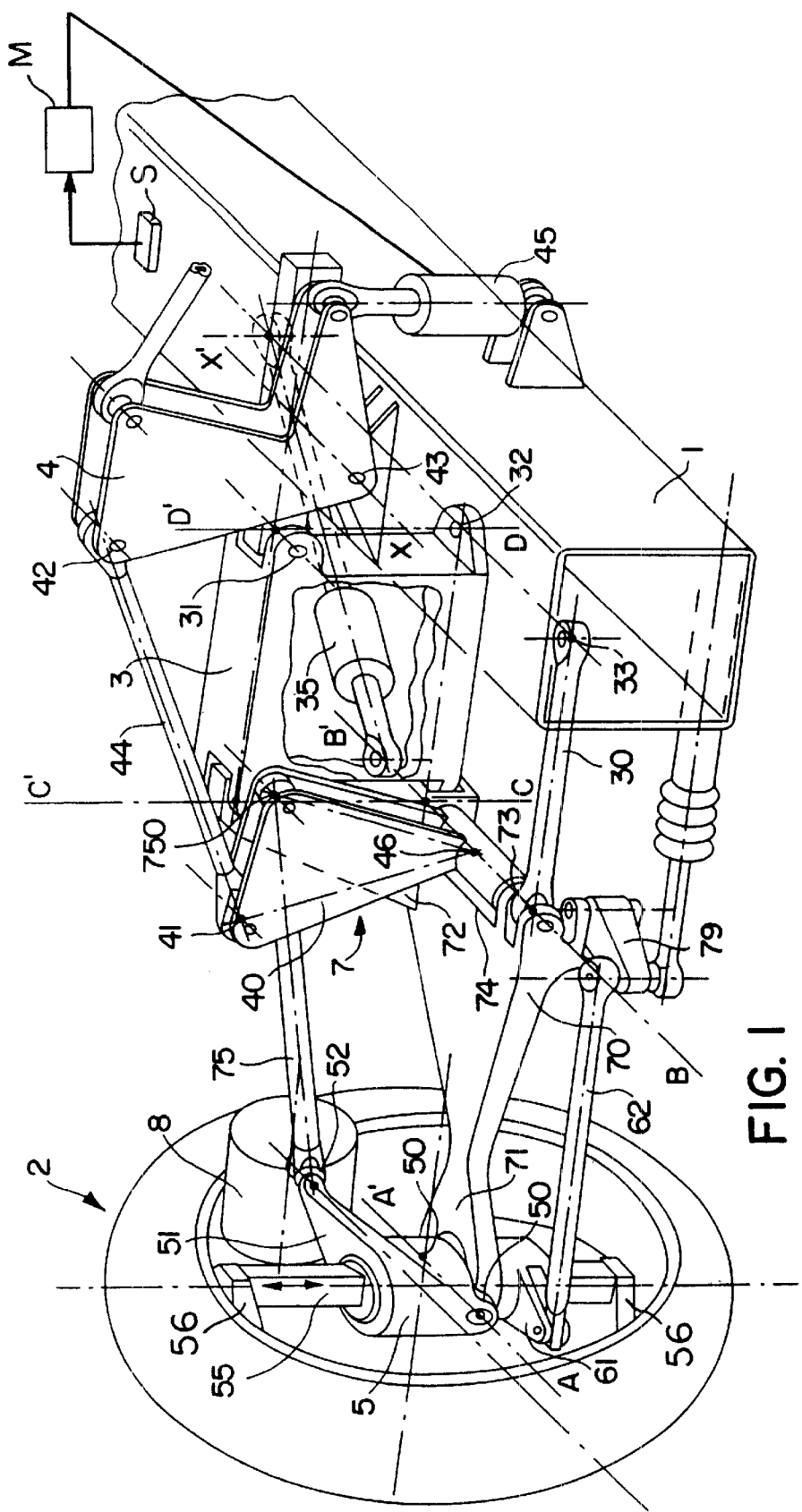
FIG. 1 is a partial perspective view showing one quarter of a vehicle.

FIG. 1 shows, in particular, a chassis 1 which consists of a central beam and to which all the members of the vehicle are fastened. Each wheel connecting system of the vehicle is preferably identical. Four wheels 2 are therefore mounted on the chassis 1 by means of identical members, and because of this it is sufficient to describe only one of the wheel connecting systems in order to describe the invention fully.

There can be seen a support 5, belonging to a wheel connecting system, and its a mounting points on the vehicle: two lower points 50, forming a horizontal axis AA', and an upper point 52 at the end of a bracket 51. There are three support mounting points, so that said support can be strictly maintained in position (maintaining the wheel plane). Moreover, there can also be seen a lever 61, on the end of which action is taken in order to control the steering of the wheel 2. On the steering axle, the levers 61 are controlled by a steering mechanism, a control rod 62 of which can be seen. Preferably, the steering mechanism is to make the angle of steering of the wheels sufficiently insensitive to variations in camber (and also to variations in roll if the roll of the body is controlled actively—a suitable installation is given below). On a nonsteering axle, either a simplified wheel connecting system is used, which prevents steering of the wheel, or the wheel carrier 56 is immobilized by connecting a link to the levers 61 in a suitable way, in this case preferably a link of adjustable length.

The wheel carrier 56 is mounted on the support 5 by means of a single bar 55 sliding in the support 5, the wheel carrier being mounted without any degree of freedom on the bar 55 at the two ends of the latter, said bar 55 being arranged in the volume delimited radially by the rim of said wheel 2, said suspension device comprising means for controlling the deflection of the wheel carrier relative to the support. This is how it is possible for the wheel 2 to be deflected vertically relative to the support 5.

Finally, a traction motor 8, for example a hydraulic or electric motor, can be seen, this type of traction being more convenient to install than a transmission by means of a mechanical shaft, in light of the need to accommodate the camber variations.

In order to control the deflection, use is made, for example, of a spring and shock absorber which are not illustrated so as not to overload the drawing. It will be possible, for example, to arrange a spring parallel to the bar 55 and offset relative to the latter, said spring being accommodated within the rim and in front of the slideway in FIG. 1. A linear or rotary shock absorber, which may be accommodated on the other side of the slideway, could be used. One of these or both may, of course, be under active control, the invention not dealing per se with the spring and damping functions.

The support 5 is fastened to the chassis 1 of the vehicle by means of an arm 70 and a rod 75. The end of the arm 70 forms a fork 71 connected to the support 5 by means of the first two points 50, with possibility of tilting of the support 5 relative to the arm 70 about the axis AA'. The arm 70 is mounted on the chassis of the vehicle so as to be capable of transmitting the suspended weight of the latter and transferring it to the support 5. The arm could be purely and simply mounted in the chassis 1, if independent horizontal suspension is not to be provided. There is still a degree of freedom of tilting of the support 5 about the axis AA'. Under the action of camber control means, the rod 75 is displaced transversely relative to the arm 70 in order to vary the position of the point 52 relative to the position of the axis AA', thus making it possible to change the camber value of the wheel 2.

Thus, the camber mechanism of the vehicle comprises an arm 70 mounted on the support 5 on an axis of support oriented substantially parallel to said longitudinal plane, and mounted on the chassis 1 without any possibility of tilting about a longitudinal axis relative to said chassis, so as to transmit the weight carried by the chassis 1 to the support 5 by means of said arm, the camber mechanism comprising a means for tilting the support about said axis of support 5.

It may be noted that the design arrangement provided by the invention makes it possible, for any camber and steering value and for any value of the deflection of the horizontal suspension, to maintain, in the plane of the wheel, the degree of freedom of deflection which vertical suspension requires. It is also because of this that the tire always remains under optimal operating conditions, even when the functioning of the tire in a transient state is considered. On a bend, and therefore when there is even appreciable camber, the vertical deflection of the wheel which may possibly be caused by uneven ground does not significantly change the way the vehicle bears transversely on its wheels. As is obvious, at this moment, a vehicle bears essentially on the wheels located on the outside of the bend. Any tendency to cause transverse variations in the groundbearing reactions of the path of the vehicle is effectively combated.

Thus, the vehicle described is notable in that each of the wheel connecting systems comprises a hub designed for supporting a wheel 2 and comprises a wheel carrier defining the axis of rotation of the hub, said wheel carrier being guided translationally relative to the support in a rectilinear movement parallel to a perpendicular to the axis of rotation of the hub, the support 5 comprising at least one mounting point to enable the support 5 to be mounted on said chassis 1.

Since the vehicle illustrating the invention comprises a horizontal suspension, the arm 70 and the rod 75 are not directly mounted on the chassis. It is necessary for the camber mechanism to be capable of following the movements of the horizontal suspension, without inducing any unwanted variation in the camber. Before the details of the camber mechanism are described, let us first examine the design of the horizontal suspension.

The arm 70, which transfers the weight of the vehicle to the wheel 2, is connected to the chassis 1, while at the same time a movement of the arm allowing horizontal suspension is permitted. In order to transmit the load, it is necessary for the arm 70 to be connected to the chassis 1 without any possibility of tilting of the arm relative to the chassis 1 about a longitudinal axis. For this purpose, the arm 70 is part of a component forming an angle piece 7. The latter comprises a vertical branch 72. Arranged at the two ends of the branch 72 are yokes allowing connection to a box 3 via a vertical axis of articulation CC'. The horizontal branch of the angle piece 7, that is to say the arm 70, comprises a ball joint 73 forming a vertical axis which is arranged transversely on that side 74 of the arm 70 opposite the fork 71 and which is arranged longitudinally on the opposite side to the vertical branch 72.

Figure 3:
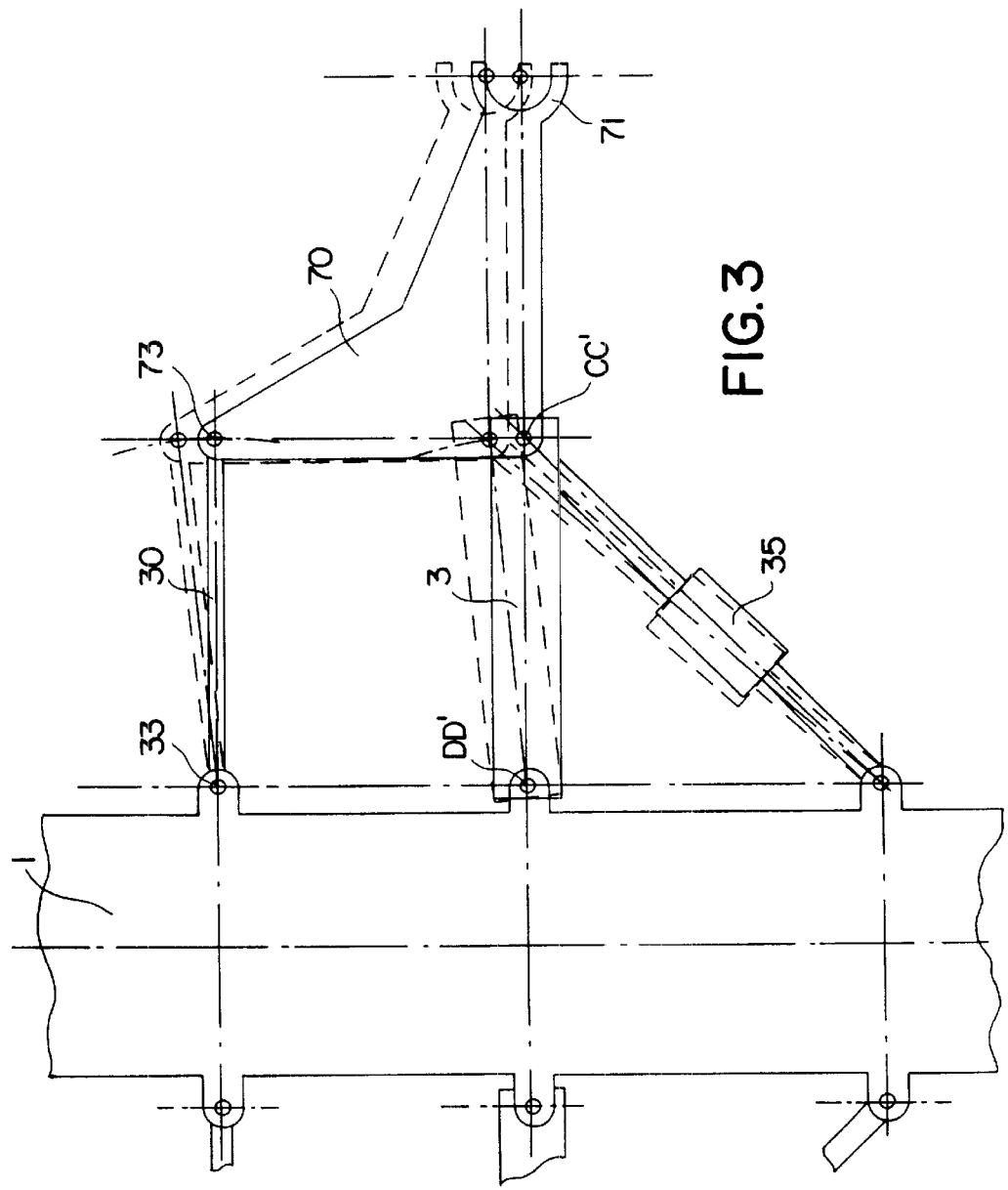
FIG. 3 is a diagrammatic top view showing the main members of a wheel connecting system, with two positions for the horizontal deflection of the suspension being superposed one on the other.

Reference to FIG. 3 makes it possible to understand how the horizontal suspension functions. It can be seen, in particular, that the position of the arm 70 and of the box 3 is represented by unbroken lines for a mid-position and by broken lines for another position. The stroke of such a horizontal suspension is a matter of centimeters, without the horizontal deflection interfering either with the camber or with the steering. Consequently, a rocker 79, correctly articulated on the arm 70, allows the steering control rod 62 to follow the deflecting movements of the horizontal suspension, without causing any induced steering.

There are therefore three support points for the arm 70, making it possible to hold it strictly, that is to say without any possibility of its tilting about a longitudinal axis Prelative to the chassis 1. The vehicle weight is transmitted to the wheel 2 via the box 3. In order to allow horizontal deflection of the wheel, while at the same time transmitting the weight of the vehicle, the box 3 is mounted on the chassis 1 on a vertical axis DD' obtained by means of two separate yokes 31 and 32. A link 30 forms a parallelogram with the box 3, the assembly as a whole being seen in a horizontal plane (see FIG. 3). The link 30 is mounted on the chassis 1 by means of a pivot 33. The horizontal movement of the arm 70 is controlled by a suitable device 35, for example a simple rubber block, in light of the small deflections for which allowance need be allowed.

This constitutes a mechanism for the horizontal suspension of the corresponding wheel: the suspended weight is transfeffed to the support 5 by means of the arm 70, the rod 75 being displaced transversely relative to the arm 70 by said camber control means, the latter being unaffected by the weight of the vehicle. The arm 70 is mounted on the chassis 1 on at least two vertical axes (here, the axes CC' and DD') which are parallel and horizontally separated, these constituting vertices of a horizontal suspension mechanism forming a parallelogram, as seen in a horizontal plane, the other two vertices being integral with the chassis 1.

Many other horizontal suspension devices may be adopted. It may be noted that the essential point, as regards the horizontal suspension, is to ensure that the arm 70 is mounted on the chassis 1 by means of a horizontal suspension device allowing the support to move parallel to the preferred running direction.

Figure 2:
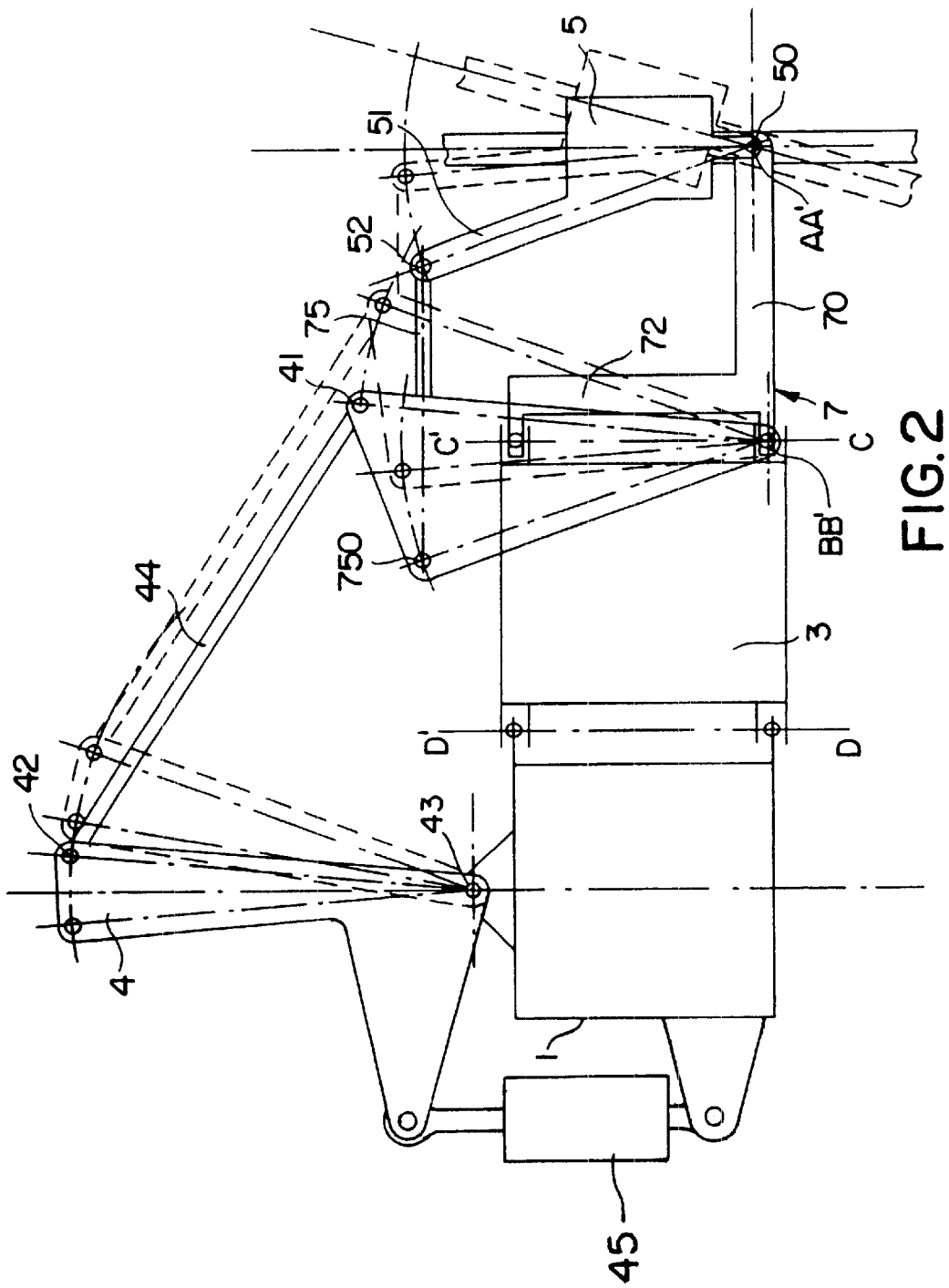
FIG. 2 is a diagrammatic front view showing the main members of a wheel connecting system, with two camber values being superposed one on the other.

We shall now continue by describing the mechanism for controlling the camber of each wheel 2. The latter, as seen in a vertical plane perpendicular to the longitudinal axis of the vehicle (see FIG. 2), forms a parallelogram, two vertices of which are formed by two mounting points 50, 52 located on the support 5 and arranged vertically one above the other and two sides of which are formed by the arm 70 and the rod 75 parallel thereto, the arm and the rod terminating at the mounting points 50, 52. This parallelogram makes it possible for the mounting points 50, 52 of the support 5 to be offset transversely toward the chassis. The length of the rod 75 corresponds to the length of the arm 70, as measured between the axes AA' and BB'. The rod 75 connects the point 52 of the support 5 to the point 750 located on a pivoted lever 40 oscillating about the axis BB'. A camber lever 4 is mounted on the chassis 1 so as to oscillate about a longitudinal axis XX' and is mounted at a chassis point 43 located transversely at the center of the vehicle. A rod 44 connects a ball joint 41 of the lever 40 to a ball joint 42 of the camber lever 4, the point 46 (located on the axis BB'), the ball joints 41, 42 and the point 43 forming a parallelogram. The ball joints 41 and 42 adapt both to the camber variations imparted to the wheel 2 and the horizontal displacements attributable to the degree of freedom introduced by the horizontal suspension.

A jack 45 is interposed between the camber lever 4 and the chassis 1. The jack 45 is controlled in such a way that it assumes a specific length according to the camber angle which is to be imparted to the wheels 2. A look at FIG. 2 makes it possible to understand the organization of the movements for controlling the wheel camber. There can be seen, in particular, the position of the rod 75 and the configuration of the lever 40 and of the camber lever 4, as represented by unbroken lines with regard to zero camber and by broken lines as regards a nonzero value of the camber.

As regards the passenger compartment P of the vehicle, either it is integral with the chassis 1 or it is mounted pivotally on the chassis 1 on a longitudinal axis of articulation XX' passing through the point 43. In the latter case, the vehicle is such that it comprises:

a passenger compartment for the transport of passengers, which is mounted on the chassis 1 so as to be inclinable about a longitudinal axis, in such a way that the passenger compartment forms a variable roll angle relative to said chassis 1, mechanical means interposed between the chassis 1 and the passenger compartment and acting so as to impart said roll angle in the same direction as the camber, calculation means for calculating said roll angle as a function of the value or values recorded, said interposed mechanical means acting under the control of said calculation means.

By making the passenger compartment integral with the camber lever 4, the passenger compartment assumes a roll angle relative to the chassis 1 which is identical to the camber angle imparted to the wheels. Thus, the camber mechanisms of each of the wheels are actuated by said mechanical means interposed between the chassis 1 and the passenger compartment, in such a way that the variation in camber of the wheels and the variation in the roll angle of the passenger compartment are synchronous. This contributes to the comfort of the passengers, additionally due to a perception of greater safety in the movement of the vehicle. It may be noted that this also contributes per se to safety, in that the center of gravity of the vehicle is displaced toward the inside of the bend, thus reducing the load fraction which is transferred to the wheels located on the outside of the bend. Not only do the tires work in a more favorable position relative to the ground, but, furthermore, in this embodiment, the instantaneous overload on the tires on the outside of the bend is lower than if there were no correction of camber.

Figure 4:
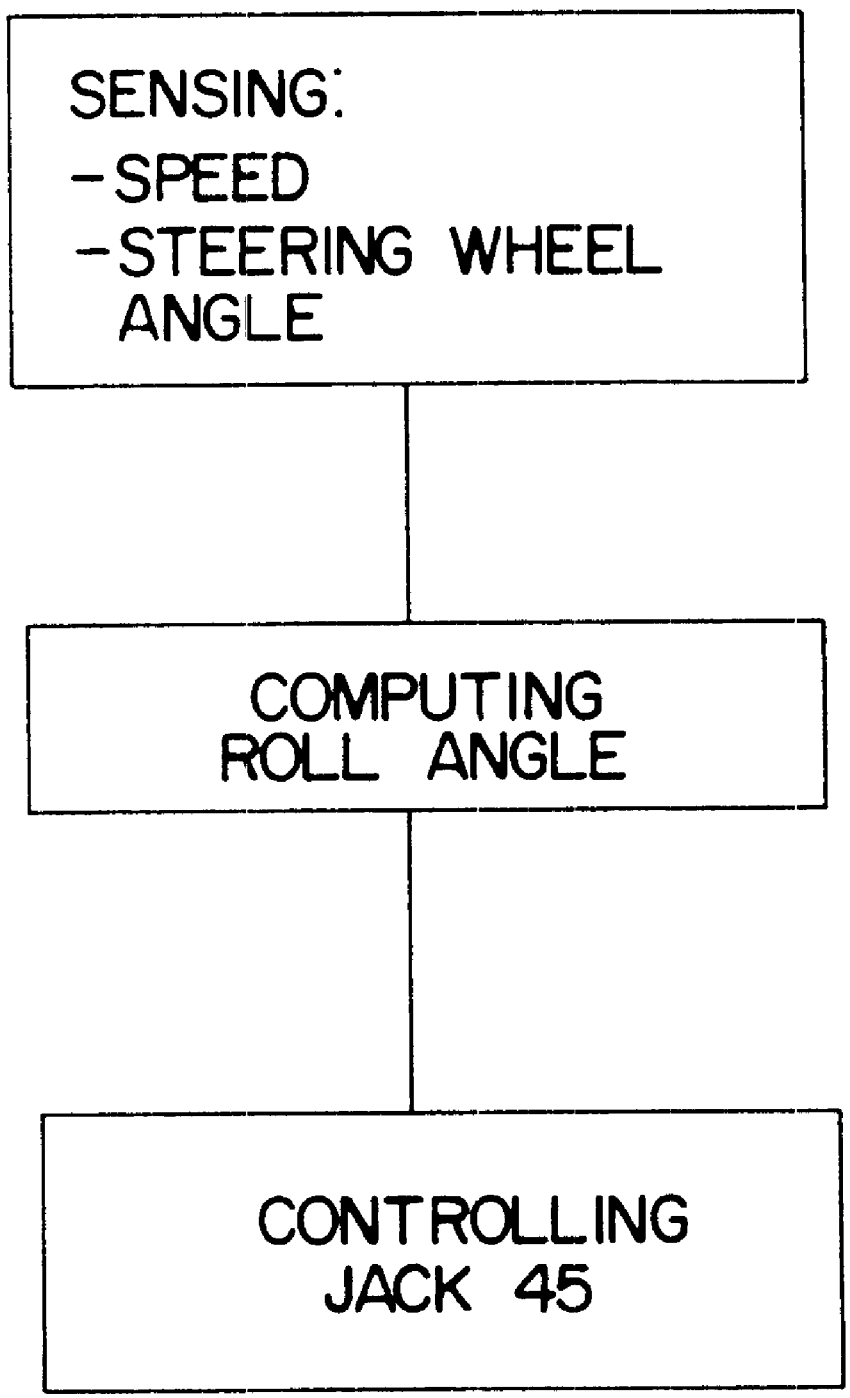
FIG. 4 is a flow chart illustrating the control of the wheel connections.
Figure 5:
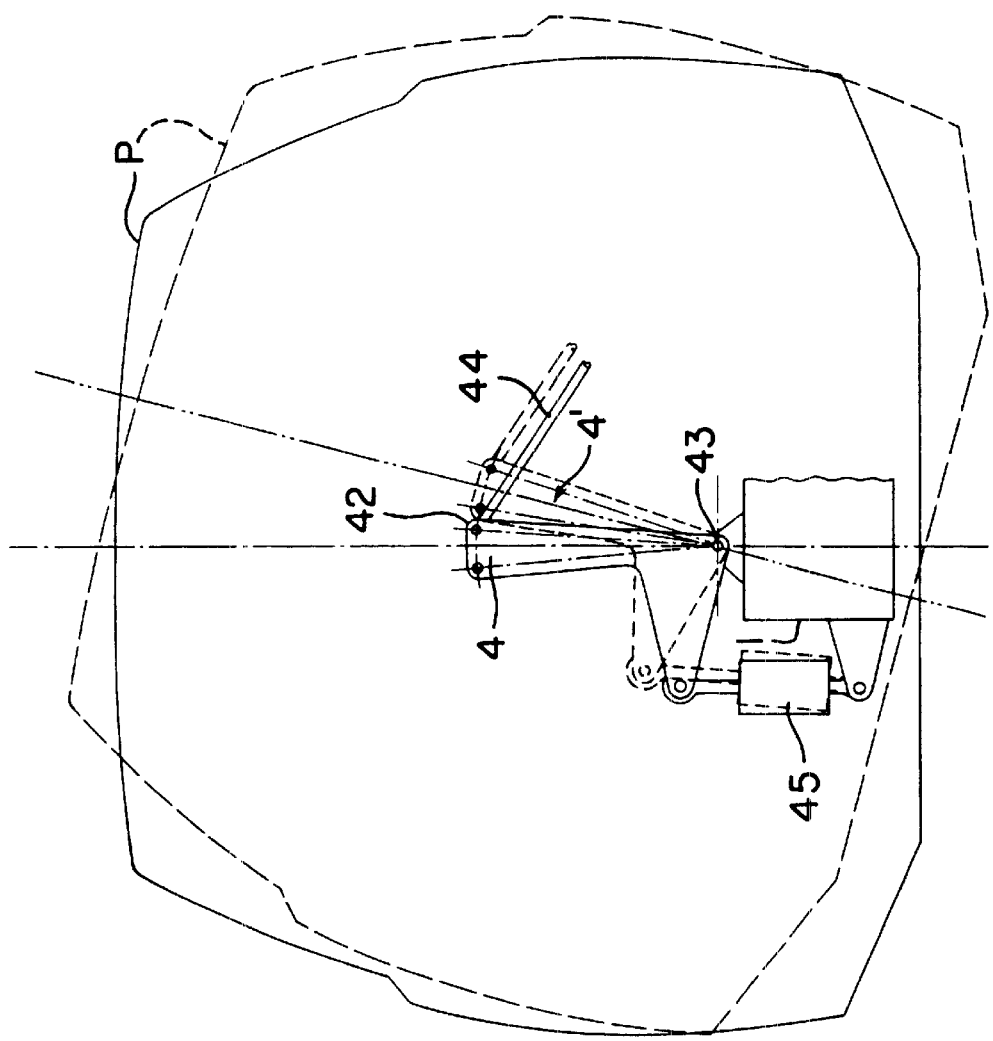
FIG. 5 is a schematic view showing the chassis, the passenger compartment, and part of the camber mechanism interposed between the chassis and the passenger compartment.

In order to control the camber angle, and indeed the roll angle, of the passenger compartment as a function of the centrifugal force exerted on the vehicle, at least one sensor S may be installed on the vehicle in order to record the value of at least one parameter making it possible to evaluate said centrifugal force. This may be a direct measurement of the centrifugal acceleration or else an evaluation as a function of indirect parameters, such as the speed of the vehicle and the steering wheel angle, as shown in FIG. 4. At all events, calculation means (for example, a microprocessor M loaded with the appropriate program) makes it possible to implement regulating strategies in the manner of the procedure for controlling active suspensions, in order to calculate the roll angle to be imparted. Such a strategy may take into account various choices for implementing it, such as, for example, a proportionality value setting the level of transverse acceleration at which the maximum roll angle permitted by the roll mechanism is reached. On the basis of the roll angle calculated, it is possible to control the jack 45, as shown in FIG. 4.

On the basis of what has just been described, the average person skilled in the art may make adaptions according to his own wishes, without departing from the scope of the present invention. For example, there is nothing to prevent adding filtering between the passenger compartment and the chassis, for example by means of elastic rubber blocks.

We claim:

1. A vehicle comprising:

a suspended longitudinally extending chassis, at least two wheel connecting systems, each comprising a wheel, said wheel connecting systems being mounted on said chassis on either side of the latter, each of the wheel connecting systems comprising a wheel mounted on a support, each wheel connecting system comprising guiding elements for deflection of the respective wheel relative to the respective support, the deflection taking place in the plane of the wheels and being sufficient to afford a vertical suspension movement, the supports being mounted on a camber mechanism, said camber mechanism being mounted on said chassis, said camber mechanism acting between the chassis and the supports so as to incline the plane of each wheel relative to said chassis in order to impart a camber angle of desired amplitude for each of said wheels to the planes of said wheels, thus making it possible to impose a variable camber angle to each of the wheels relative to the ground in the same direction, a passenger compartment mounted on said chassis so as to be inclinable about a longitudinal roll axis and interconnected with the chassis such that a roll angle of the passenger compartment is variable in the same direction as the camber angle of each wheel, and a controller responsive to a parameter representative of the transverse acceleration of the vehicle for controlling the camber mechanism to adjust at least the camber angle.

2. A vehicle as claimed in claim 1, wherein the camber mechanism comprises an arm mounted on each support on an axis of support and mounted on the chassis without any possibility of tilting about a longitudinal axis relative to said chassis, so as to transmit the weight carried by the chassis to the supports by means of the arms.

3. A vehicle as claimed in claim 2, wherein the suspended weight is transferred to each support by means of the respective arm, the camber mechanism comprising a rod displaced transversely relative to each arm.

4. A vehicle as claimed in claim 3, wherein the camber mechanism, as seen in a vertical plane perpendicular to the longitudinal axis of the vehicle, forms a parallelogram on either side of the chassis, two vertices of which are formed by two mounting points located on the supports and arranged vertically one above the other and two parallel sides of which are formed by the arms and the rods parallel thereto, the arms and the rods terminating at the mounting points.

5. A vehicle as claimed in claim 4, wherein each rod is displaced transversely relative to the respective arm by said controller, and wherein each arm is mounted on the chassis by means of a horizontal suspension device allowing the respective support to move parallel to a running direction, which is parallel to the longitudinal axis of the vehicle.

6. A vehicle as claimed in claim 5, wherein each arm is mounted on the chassis on at least two vertical axes which are parallel and horizontally separated, these constituting two vertices of a parallelogram formed by the respective horizontal suspension device, as seen in a horizontal plane, the other two vertices being fixed with respect to the chassis.

7. A vehicle as claimed in claim 1, wherein each of the wheel connecting systems comprises a wheel carrier defining the axis of rotation of the respective wheel, wherein each wheel carrier is guided translationally relative to the respective support in a rectilinear movement parallel to an axis perpendicular to the axis of rotation of the respective wheel.

8. A vehicle as claimed in claim 7, wherein each wheel carrier is mounted on the respective support by means of a single bar sliding in the support, the wheel carriers being mounted on the bars at the two ends of the latter, each bar being arranged in the volume delimited radially by the rim of the respective wheel.

9. A vehicle as claimed in claim 1, wherein the variation in the camber angle of the wheels and the variation in the roll angle of the passenger compartment are synchronous.

10. A vehicle as claimed in claim 1, wherein said controller comprises a microprocessor and at least one sensor for sensing the value of at least one parameter representative of the transverse acceleration of the vehicle, said microprocessor controlling adjustment of the camber mechanism.

11. A vehicle as claimed in claim 1, wherein the passenger compartment is interconnected with the chassis via the camber mechanism.

12. A vehicle as claimed in claim 1, wherein the camber mechanism comprises an arm mounted on each support on an axis of support and mounted on the chassis, a rod displaced transversely relative to each arm, and wherein the camber mechanism, as seen in a vertical plane perpendicular to the longitudinal axis of the vehicle, forms a parallelogram on either side of the chassis, two vertices of which are formed by two mounting points located on the supports and arranged vertically one above the other and two parallel sides of which are formed by the arms and the rods parallel thereto, the arms and the rods terminating at the mounting points.

* * * * *

UNITED STATES PATENT AND TRADEMARK OFFICE
CERTIFICATE OF CORRECTION

PATENT NO.    : 6,547,260 B2                                                Page 1 of 1
DATED         : April 15, 2003
INVENTOR(S)   : Daniel Laurent et al.

It is certified that error appears in the above-identified patent and that said Letters Patent is hereby corrected as shown below:

Column 3,
Line 49, "of" (first occurrence) should read -- on --
Line 50, "±20." should read -- ±20º. --

Column 4,
Line 2, "wheelplane" should read -- wheel plane --

Column 7,
Lines 3-4, "Prelative" should read -- relative --
Line 17, "transfeffed" should read -- transferred --

Column 8,
Line 12, "camber," should read -- camber, and --
Line 57, "adaptions" should read -- adaptations --

Signed and Sealed this

Twenty-fifth Day of November, 2003

JAMES E. ROGAN
*Director of the United States Patent and Trademark Office*